United States Patent
Welinder et al.

(10) Patent No.: US 9,355,360 B2
(45) Date of Patent: May 31, 2016

(54) SYSTEMS AND METHODS FOR THE DETERMINING ANNOTATOR PERFORMANCE IN THE DISTRIBUTED ANNOTATION OF SOURCE DATA

(71) Applicant: California Institute of Technology, Pasadena, CA (US)

(72) Inventors: Peter Welinder, San Diego, CA (US); Pietro Perona, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 547 days.

(21) Appl. No.: 13/921,493

(22) Filed: Jun. 19, 2013

(65) Prior Publication Data

US 2013/0346409 A1 Dec. 26, 2013

Related U.S. Application Data

(60) Provisional application No. 61/663,138, filed on Jun. 22, 2012.

(51) Int. Cl.
*G06F 17/30* (2006.01)
*G06N 5/04* (2006.01)

(52) U.S. Cl.
CPC .......... *G06N 5/048* (2013.01); *G06F 17/30303* (2013.01); *G06F 17/30525* (2013.01); *G06F 17/30598* (2013.01)

(58) Field of Classification Search
None
See application file for complete search history.

(56) References Cited

U.S. PATENT DOCUMENTS

| 7,809,722 | B2 | 10/2010 | Gokturk et al. |
| 7,987,186 | B1 | 7/2011 | Joshi |
| 8,418,249 | B1 | 4/2013 | Nucci et al. |
| 8,818,793 | B1 * | 8/2014 | Bangalore ............. G06F 17/271 704/1 |
| 8,849,648 | B1 * | 9/2014 | Bangalore ........... G06F 17/2705 704/1 |
| 2008/0005064 | A1 * | 1/2008 | Sarukkai ............... G06F 17/241 |
| 2013/0024457 | A1 | 1/2013 | Chua et al. |
| 2013/0031457 | A1 * | 1/2013 | Griffiths ................ G06F 17/241 715/231 |
| 2013/0097164 | A1 | 4/2013 | Welinder et al. |
| 2014/0304270 | A1 * | 10/2014 | Torkamani ............. G06F 19/24 707/740 |

OTHER PUBLICATIONS

Antoniak, "Mixtures of Dirchlet Processes with Applications to Bayesian Nonparametric Problems", The Annals of Statistics, 1974, vol. 2, No. 6, pp. 1152-1174.
Attias, "A Variational Bayesian Framework for Graphical Models", NIPS, 1999, pp. 209-215.

(Continued)

Primary Examiner — Hung Le
(74) *Attorney, Agent, or Firm* — KPPB LLP

(57) ABSTRACT

Systems and methods for determining annotator performance in the distributed annotation of source data in accordance embodiments of the invention are disclosed. In one embodiment of the invention, a method for clustering annotators includes obtaining a set of source data, determining a training data set representative of the set of source data, obtaining sets of annotations from a set of annotators for a portion of the training data set, for each annotator determining annotator recall metadata based on the set of annotations provided by the annotator for the training data set and determining annotator precision metadata based on the set of annotations provided by the annotator for the training data set, and grouping the annotators into annotator groups based on the annotator recall metadata and the annotator precision metadata.

20 Claims, 6 Drawing Sheets

(56) References Cited

OTHER PUBLICATIONS

Bennett, "Using Asymmetric Distributions to Improve Classifier Probabilities: A Comparison of New and Standard Parametric Methods", Technical report, Carnegie Mellon University, 2002, 24 pgs.
Berg et al., "Automatic Attribute Discovery and Characterization from Noisy Web Data", Computer Vision—ECCV 2010, pp. 663-676.
Beygelzimer et al., "Importance Weighted Active Learning", Proceedings of the 26th International Conference on Machine Learning, 2009, 8 pgs.
Bourdev et al., "Poselets: Boyd Part Detectors Trained Using 3D Human Pose Annotations", ICCV, 2009, 42 pgs.
Byrd et al., "A Limited Memory Algorithm for Bound Constrained Optimization", SIAM Journal on Scientific and Statistical Computing, 1995, vol. 16, No. 5, pp. 1190-1208.
Cohn et al., "Active Learning with Statistical Models", Journal of Artificial Intelligence Research, 1996, vol. 4, pp. 129-145.
Dalal et al., "Histograms of Oriented Gradients for Human Detection", ICCV, 2005, 8 pgs.
Dankert et al., "Automated Monitoring and Analysis of Social Behavior in Ddrosophila", Nat. Methods, Apr. 2998, vol. 6, No. 4, 17 pgs.
Dasgupta et al., "Hierarchical Sampling for Active Learning", ICML, 2008, 8 pgs.
Dawid et al., "Maximum Likelihood Estimation of Observer Error-rates using the EM Algorithm", J. Roy. Statistical Society, Series C, 1979, vol. 28, No. 1, pp. 20-28.
Deng et al., "ImageNet: A Large-Scale Hierarchical Image Database", CVPR, 2009, 8 pgs.
Dollar et al., "Cascaded Pose Regression", CVPR, 2010, pp. 1078-1085.
Dollar et al., "Pedestrian Detection: An Evaluation of the State of the Art", IEEE Transactions on Pattern Analysis and Machine Intelligence, 2011, 20 pgs.
Erkanli et al., "Bayesian semi-parametric ROC analysis", Statistics in Medicine, 2006, vol. 25, pp. 3905-3928.
Fei-Fei et al., "A Bayesian Hierarchical Model for Learning Natural Scene Categories", CVPR, IEEE Computer Society, 2005, pp. 524-531.
Frank et al., "UCI Machine Learning Repository", 2010, 3 pgs.
Fuchs et al., "Randomized tree ensembles for object detection in computational pathology", Lecture Notes in Computer Science, ISVC, 2009, vol. 5875, pp. 367-378.
Gionis et al., "Clustering Aggretation", ACM Transactions on Knowledge Discovery from Data, 2007. vol. 1, 30 pgs.
Gomes, et al., "Crowdclustering", Technical Report, Caltech 20110628-202526159, Jun. 2011, 14 pgs.
Gomes et al., "Crowdclustering", Technical Report, Caltech, 2011, pp. 558-561.
Gu et al, "Bayesian bootstrap estimation of ROC curve", Statistics in Medicine, 2008, vol. 27, pp. 5407-5420.
Hellmich et al., "Bayesian Approaches to Meta-analysis of ROC Curves", Med. Decis. Making, Jul.-Sep. 1999, vol. 19, pp. 252-264.
Jaakkola et al., "A variational approach to Bayesian logistic regression models and their extensions", Source unknown, Aug. 13, 1996, 10 pgs.
Kruskal, "Multidimensional Scaling by Optimizing Goodness of Fit to a Nonmetric Hypothesis", Psychometrika, Mar. 1964. vol. 29, No. 1, pp. 1-27.
Kurihara et al., "Accelerated Variational Dirichlet Process Mixtures", Advances in Neural Information Processing Systems, 2007, 8 pgs.
Li et al., "Solving consensus and Semi-supervised Clustering Problems Using Nonnegative Matrix Factorization", ICDM, IEEE computer society 2007. pp. 577-582.
Little et al., "Exploring Iterative and Parallel Human Computational Processes", HCOMP, 2010, pp. 68-76.
Little et al., "TurKit: Tools for Iterative Tasks on Mechanical Turk", HCOMP, 2009, pp. 29-30.
Maceachern et al., "Estimating Mixture of Dirichlet Process Models", Journal of Computational and Graphical Statistics, Jun. 1998, vol. 7, No. 2, pp. 223-238.
MacKay, "Information-Based objective Functions for Active Data Selection", Neural Computation, 1992, vol. 4, pp. 590-604.
Martinez-Munoz et al., "Dictionary-Free Categorization of Very Similar Objects via Stacked Evidence Trees", Source unknown, 2009, 8 pgs.
Meila, "Comparing Clusterings by the Variation of Information", Learning theory and Kernel machines: 16th Annual Conference of Learning Theory and 7th Kernel Workshop, COLT/Kernel 2003, 31 pgs.
Monti et al., "Consensus Clustering: A Resampling-Based Method for Class Discovery and Visulation of Gene Expression Microarray Data", Machine Learning, 2003, vol. 52, pp. 91-118.
Neal, "MCMC Using Hamiltonian Dynamics", Handbook of Markov Chain Monte Carlo, 2010, pp. 113-162.
Nigam et al., "Text Classification from labeled and Unlabeled Documents Using EM", Machine Learning, 2000, vol. 39, No. 2/3, pp. 103-134.
Platt, "Probalisitic Outputs for Support Vector Machines and Comparisons to Regularized Likelihood Methods", Advances in Large Margin Classiers, 1999, MIT Press, pp. 61-74.
Raykar et al., "Supervised Learning from Multiple Experts: Whom to trust when everyone lies a bit", ICML, 2009, 8 pgs.
Russell et al., "LabelMe: A Database and Web-Based Tool for Image Annotation", Int. J. Computer. Vis., 2008, vol. 77, pp. 157-173.
Seeger, "Learning with labeled and unlabeled data", Technical Report, University of Edinburgh, 2002, 62 pgs.
Sheng et al., "Get Another Label? Improving Data Quality and Data Mining Using Multiple, Noisy Labelers", KDD, 2008, 9 pgs.
Smyth et al., "Inferring Ground Truth from Subjective Labeling of Venus Images", NIPS, 1995, 8 pgs.
Snow et al., "Cheap and Fast—But is it Good? Evaluating Non-Expert Annotations for Natural Language Tasks", EMNLP, 2008, 10 pgs.
Sorokin et al., "Utility data annotation with Amazon Mechanical Turk", First IEEE Workshop on Internet Vision at CVPR '08, 2008, 8 pgs.
Spain et al., "Some objects are more equal than others: measuring and predicting importance", ECCV, 2008, 14 pgs.
Strehl et al., "Cluster Ensembles—A Knowledge Reuse Framework for Combining Multiple Partitions", Journal of Machine Learning Research, 2002, vol. 3, pp. 583-617.
Tong et al, "Support Vector Machine Active Learning with Applications to Text Classification", Journal of Machine Learning Research, 2001, pp. 45-66.
Vijayanarasimhan et al, "Large-Scale Live Active Learning: Training Object Detectors with Crawled Data and Crowds", CVPR, 2001, pp. 1449-1456.
Vijayanarasimhan et al., "What's It Going to Cost You?: Predicting Effort vs. Informataiveness for Multi-Label Image Annotations", CVPR, 2009, pp. 2262-2269.
Von Ahn et al., "Labeling Images with a Computer Game", SIGCHI conference on Human factors in computing systems, 2004, pp. 319-326.
Von Ahn et al., "reCAPTCHA: Human-Based Character Recognition via Web Security Measures", Science, 2008, vol. 321, No. 5895, pp. 1465-1468.
Vondrick et al, "Efficiently Scaling up Video Annotation with Crowdsourced Marketplaces", ECCV, 2010, pp. 610-623.
Welinder et al., "Caltech—UCSD Birds 200", Technical Report CNS-TR-2010-001, 2001, 15 pgs.
Welinder et al., "Online crowdsourcing: rating annotators and obtaining cost-effective labels", IEEE Conference on Computer Vision and Pattern Recognition Workshops (ACVHL), 2010, pp. 25-32.

(56) References Cited

OTHER PUBLICATIONS

Welinder et al., "The Multidimensional Wisdom of Crowds", Neural Information Processing Systems Conference (HIPS), 2010, pp. 1-9.

Whitehill et al, "Whose Vote Should Count More: Optimal Integration of Labels from Labelers of Unknown Expertise", NIPS, 2009, 9 pgs.

Zhu, "Semi-Supervised Learning Literature Survey", Technical report, University of Wisconsin-Madison, 2008, 60 pgs.

* cited by examiner

SYSTEMS AND METHODS FOR THE DETERMINING ANNOTATOR PERFORMANCE IN THE DISTRIBUTED ANNOTATION OF SOURCE DATA

CROSS-REFERENCE TO RELATED APPLICATIONS

The current application claims priority to U.S. Provisional Patent Application No. 61/663,138, titled "Method for Combining Human and Machine Computation for Classification and Regression Tasks" to Welinder et al. and filed Jun. 22, 2012, the disclosures of which is hereby incorporated by reference in its entirety.

STATEMENT OF FEDERAL FUNDING

This invention was made with government support under Grant No. IIS0413312 awarded by the National Science Foundation and under Grant No. N00014-06-1-0734 and Grant No. N00014-10-1-0933 awarded by the Office of Naval Research. The government has certain rights in the invention.

FIELD OF THE INVENTION

The present invention is generally related to data annotation and more specifically the determination of annotator performance in the distributed annotation of source data.

BACKGROUND OF THE INVENTION

Amazon Mechanical Turk is a service provided by Amazon.com of Seattle, Wash. Amazon Mechanical Turk provides the ability to submit tasks and have a human complete the task in exchange for a monetary reward for completing the task.

SUMMARY OF THE INVENTION

Systems and methods for determining annotator performance in the distributed annotation of source data in accordance embodiments of the invention are disclosed. In one embodiment of the invention, a method for clustering annotators via a distributed data annotation process includes obtaining a set of source data using a distributed data annotation server system, where a piece of source data in the set of source data includes at least one identifying feature, determining a training data set representative of the set of source data using the distributed data annotation server system, where each piece of source data in the training data set includes source data metadata describing the ground truth for the piece of source data, where the ground truth for a piece of source data describes the features contained in the piece of source data and a correct label associated with each feature, obtaining sets of annotations from a set of annotators for a portion of the training data set using the distributed data annotation server system, where an annotation identifies one or more features within a piece of source data in the training data set, for each annotator determining annotator recall metadata based on the set of annotations provided by the annotator for the training data set using the distributed data annotation server system, where the annotator recall metadata includes a measure of the number of features within a piece of source data identified with a label in the set of annotations by the annotator and determining annotator precision metadata based on the set of annotations provided by the annotator for the training data set using the distributed data annotation server system, where the annotator precision metadata includes a measure of the number of correct annotations associated with each piece of source data based on the ground truth for each piece of source data, and grouping the annotators into annotator groups based on the annotator recall metadata and the annotator precision metadata using the distributed data annotation server system.

In another embodiment of the invention, clustering annotators further includes generating an annotation task including a portion of the set of source data using the distributed data annotation server system, where the annotation task configures an annotator to annotate one or more features within the set of source data.

In an additional embodiment of the invention, the annotation tasks are targeted toward one or more annotator groups.

In yet another additional embodiment of the invention, clustering annotators further includes measuring the time taken by an annotator to provide an annotation within the sets of annotations using the distributed data annotation server system.

In still another additional embodiment of the invention, clustering annotators further includes calculating a reward based on the annotator recall metadata and the annotator precision metadata using the distributed data annotation server system and providing the reward to an annotator for providing one or more annotations using the distributed data annotation server system.

In yet still another additional embodiment of the invention, grouping annotators into annotator groups is further based on the calculated reward.

In yet another embodiment of the invention, the obtained sets of annotations are clustered into annotation clusters based on the features within the piece of source data identified by the annotations using the distributed data annotation server system.

In still another embodiment of the invention, the set source data includes image data and the annotation clusters include annotations that are within a distance threshold from each other within the image data.

In yet still another embodiment of the invention, the annotation clusters includes annotations that are within a distance threshold from the ground truth for the feature identified by the annotations.

In yet another additional embodiment of the invention, clustering annotators further includes determining an error rate for each annotator based on the annotation clusters using the distributed data annotation server system and grouping the annotators into annotator groups based on the determined error rate for the annotators using the distributed data annotation server system.

Still another embodiment of the invention includes a distributed data annotation server system including a processor and a memory configured to store a data annotation application, wherein the data annotation application configures the processor to obtain a set of source data, where a piece of source data in the set of source data includes at least one identifying feature, determine a training data set representative of the set of source data, where each piece of source data in the training data set includes source data metadata describing the ground truth for the piece of source data, where the ground truth for a piece of source data describes the features contained in the piece of source data and a correct label associated with each feature, obtain sets of annotations from a set of annotators for a portion of the training data set, where an annotation identifies one or more features within a piece of source data in the training data set, for each annotator determine annotator recall metadata based on the set of annotations provided by the annotator for the training data set, where the annotator recall metadata includes a measure of the number of features within a piece of source data identified with a label in the set of annotations by the annotator and determine annotator precision metadata based on the set of annotations provided by the annotator for the training data set, where the annotator precision metadata includes a measure of the number of correct annotations associated with each piece of source data based on the ground truth for each piece of source data, and group the annotators into annotator groups based on the annotator recall metadata and the annotator precision metadata.

In yet still another additional embodiment of the invention, the data annotation application further configures the processor to generate an annotation task including a portion of the set of source data, where the annotation task configures an annotator to annotate one or more features within the set of source data.

In yet another embodiment of the invention, the annotation tasks are targeted toward one or more annotator groups.

In still another embodiment of the invention, the data annotation application further configures the processor to measure the time taken by an annotator to provide an annotation within the sets of annotations.

In yet still another embodiment of the invention, the data annotation application further configures the processor to calculate a reward based on the annotator recall metadata and the annotator precision metadata and provide the reward to an annotator for providing one or more annotations.

In yet another additional embodiment of the invention, the processor is further configured to group annotators into annotator groups based on the calculated reward.

In still another additional embodiment of the invention, the processor is configured to cluster the obtained sets of annotations into annotation clusters based on the features within the piece of source data identified by the annotations.

In yet still another embodiment of the invention, the set source data includes image data and the annotation clusters include annotations that are within a distance threshold from each other within the image data.

In yet another additional embodiment of the invention, the annotation clusters include annotations that are within a distance threshold from the ground truth for the feature identified by the annotations.

In still another additional embodiment of the invention, the data annotation application further configures the processor to determine an error rate for each annotator based on the annotation clusters and group the annotators into annotator groups based on the determined error rate for the annotators.

DETAILED DESCRIPTION

Figure 1:
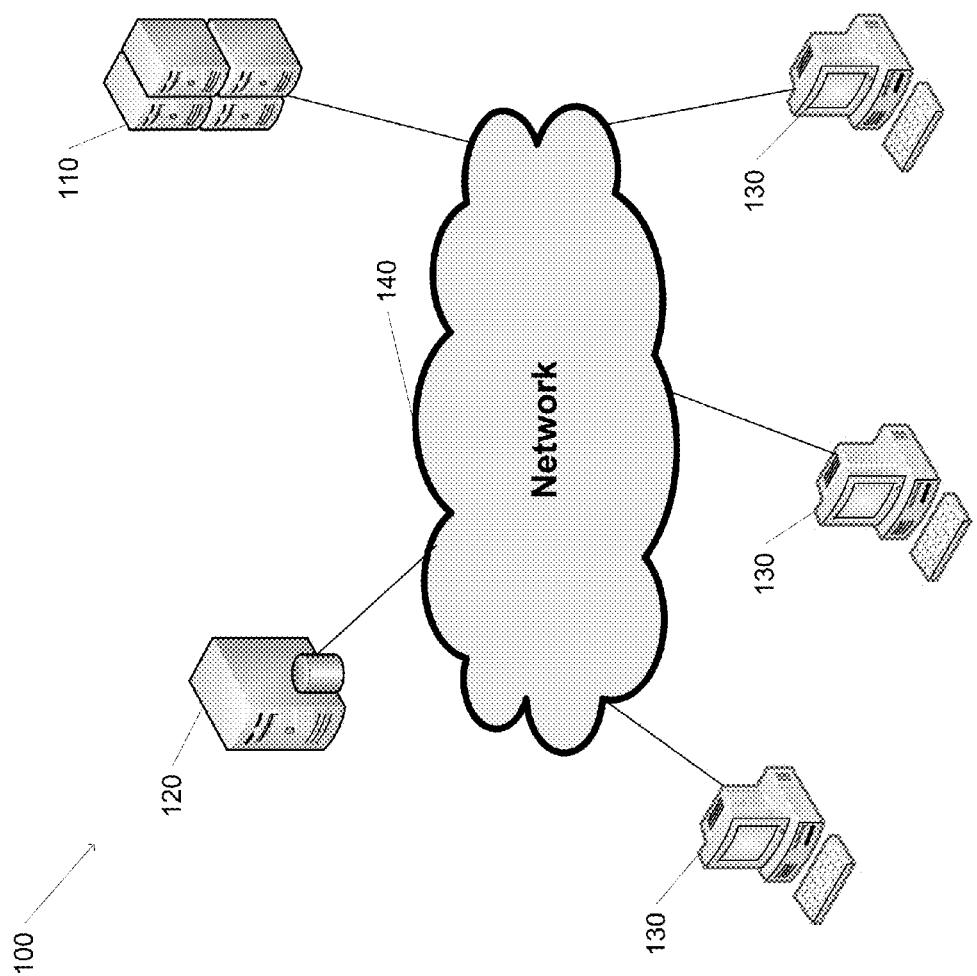
FIG. 1 conceptually illustrates a distributed data annotation system in accordance with an embodiment of the invention.

Turning now to the drawings, systems and methods for determining annotator performance in the distributed annotation of source data in accordance with embodiments of the invention are illustrated. In a variety of applications including, but not limited to, medical diagnosis, surveillance verification, performing data de-duplication, transcribing audio recordings, or researching data details, a large variety of source data, such as image data, audio data, signal data, and text data, can be generated and/or obtained. By annotating features within these pieces of source data, particular portions of the source data can be identified for particular purposes and/or additional analysis. Systems and methods for annotating source data that can be utilized in accordance with embodiments of the invention are disclosed in U.S. patent application Ser. No. 13/651,108, titled "Systems and Methods for Distributed Data Annotation" to Welinder et al. and filed Oct. 12, 2012, the entirety of which is hereby incorporated by reference. However, particularly in applications having a large number of pieces of source data, annotating the data can be difficult and/or time consuming. It may not be realistic to expect a single person or machine to look at all images and determine annotations for the set of source data, as it may not be time and/or cost effective to have a single source of annotations. Likewise, a single person or machine may not be able to identify every feature present within the set of source data. Additionally, individual sources of annotations, whether untrained sources or expert sources, might not agree on the criteria used to annotate features within the source data and may not even agree on the features present within the set of source data. Accordingly, systems and methods in accordance with embodiments of the invention determine the performance of annotators at specific types of annotation tasks and use the performance information in the allocation of annotation tasks.

Distributed data annotation systems in accordance with embodiments of the invention can be configured to obtain sets of source data and create training data sets representative of the obtained source data. The training data sets can include pieces of source data from the obtained source data and/or additional pieces of data representative of the set of source data. The pieces of source data in the training data set are analyzed (such as by an expert or previously known information) and the ground truth of the features (or the absence thereof) are identified within the pieces of source data. The training data is then distributed to one or more annotators that are configured to identify the features within the pieces of source data. Based on annotations of the identified features provided by the annotators and the previously identified ground truth of the features, the performance of the annotators can be determined. As discussed below, annotator performance can be based on precision (e.g. the number of annotations that are correct with respect to the ground truth), recall (the number of features present that are annotated), and any other attributes (including, but not limited to, total cost, and time taken) as appropriate to the requirements of specific applications in accordance with embodiments of the invention. In a variety of embodiments, the performance of the annotators is determined by clustering the annotations provided by multiple annotators for pieces of source data with respect to the ground truth (and/or clustered relative to each other if no ground truth is available) for the pieces of source data and determining a confidence score based on the distances between the identified clusters and the annotations. Based on the measured performance, the annotators can be grouped together into annotator groups. The annotator groups (or subsets thereof) can then be tasked with the additional annotation on the pieces of source data that are not in the training data sets. The annotation tasks for the non-training pieces of source data can be targeted to the annotator groups based on their performance in that the better performing groups are more likely to be able to complete difficult annotation tasks quickly and/or in a cost-effective manner. Likewise, lower-performing annotator groups can be tasked with routine annotations that may not necessitate the skill of the better performing annotator groups. Furthermore, distributed data annotation server systems can be configured to tailor annotation tasks for the pieces of source data and/or rewards for completing the annotation tasks based on the performance of the annotator groups.

Based on the annotator performance, annotators can be scored based on their performance in various annotation tasks and ranked according to the scores. The annotator rankings can be used in the selection (or targeting) of annotators for particular annotation tasks and the rankings can be updated based upon additional tasks the annotators perform. The rankings can also include annotator profiles including a variety of information as appropriate to the requirements of specific applications in accordance with embodiments of the invention, such as a history of annotation tasks performed, the performance with respect to particular annotation tasks, the time taken for annotations, rewards earned by the annotator, requested rewards for additional annotation tasks, a user rating for the annotator, demographic information, and/or particular types of source data the annotator is skilled in annotating.

The distributed data annotation server system can also request the iterative annotation of source data. The iterative annotation of source data involves obtaining an initial set of annotations from a set of annotators, then providing the source data and the initial set of annotations to a second set of annotators that refine, correct, and/or confirm the initial set of annotations. This iterative process can be repeated until the desired level of certainty with respect to the annotations is achieved. The performance of the annotators with respect to annotation tasks in the variety of stages of the iterative annotation process can be utilized to target particular annotators for particular annotation tasks. For example, some annotators (or annotator groups) may perform better at refining existing annotations than identifying features within a piece of source data; these annotators can be avoided for the initial annotation tasks and targeted for the iterative refinement annotation tasks.

In a number of embodiments, the annotation of data is performed in a similar manner to classification via a taxonomy in that an initial distributed data annotation is performed using broad categories and annotation tasks and metadata is collected concerning the difficulty of annotating the pieces of source data and the capabilities of the annotators. The difficulty of annotating a piece of source data can be calculated using a variety of techniques as appropriate to the requirements of specific applications in accordance with embodiments of the invention, including determining the difficulty based on the performance of the annotators annotating a piece of source data having a known ground truth value in a set of training data. The capabilities of the annotators with respect to the source data can be considered in the allocation of (additional) annotation tasks to refine and/or improve the annotation of the source data. The capabilities of the annotators can be determined utilizing a variety of techniques as appropriate to the requirements of specific applications in accordance with embodiments of the invention, including those described above. Each of the initial broad categories can then be transmitted to the annotators by the distributed data annotation server system to further refine the source data metadata associated with each piece of source data in the broad categories and the process repeated until sufficient metadata describing the source data is collected. With each pass across the data by the data annotation devices, the distributed data annotation server system can use the received annotations for one or more pieces of source data to refine the measured performance of the annotators in the annotator groups and update the corresponding annotator performance metadata. Based upon the updated annotator performance metadata, the distributed data annotation server system can further refine the selection of annotator (groups) and/or pieces of source data targeted in additional annotation tasks for subsequent annotations of the source data. Specific taxonomy based approaches for annotating source data with increased specificity are discussed above; however, any of a variety of techniques can be utilized to annotate source data including techniques that involve a single pass or multiple passes by the same (or different) sets of annotators as appropriate to the requirements of specific applications in accordance with embodiments of the invention.

Annotators utilize data annotation devices to perform the annotation of pieces of source data. Data annotation devices can include (but are not limited to) human annotators, machine-based annotation devices, and/or a combination of machine and human annotation as appropriate to the requirements of specific applications in accordance with embodiments of the invention. The data annotation devices are configured to identify features within pieces of source data based on a received annotation task. In several embodiments, the annotation of data is a human intelligence task where human annotators are asked to identify particular features within pieces of source data. As appropriate to the requirements of specific applications in accordance with embodiments of the invention, data annotation devices provide a user interface that presents an annotation task and pieces of source data to an annotator. Data annotation devices can also include input devices configured to receive user input, and generate source data metadata including annotations based on the user input identifying features of the source data presented to the annotator.

Although the above is described with respect to distributed data annotation server systems and annotators utilizing data annotation devices, the data annotation devices and/or annotators can be implemented using the distributed data annotation server system (e.g. as software configuring a processor in the distributed data annotation server system to perform the annotation process) as appropriate to the requirements of specific applications in accordance with embodiments of the invention. Systems and methods for determining annotator performance in the distributed annotation of source data in accordance with embodiments of the invention are discussed below.

Distributed Data Annotation Systems

Distributed data annotation systems in accordance with embodiments of the invention are configured to distribute sets of training data to a variety of annotators and, based on the annotations obtained from the annotators, group the annotators based on their performance and determine appropriate rewards and/or annotation tasks for the annotator groups. A conceptual illustration of a distributed data annotation system in accordance with an embodiment of the invention is shown in FIG. 1. Distributed data annotation system 100 includes distributed data annotation server system 110 connected to source data database 120 and one or more data annotation devices 130 via network 140. In many embodiments, distributed data annotation server system 110 and/or source data database 120 are implemented using a single server. In a variety of embodiments, distributed data annotation server system 110 and/or source data database 120 are implemented using a plurality of servers. In many embodiments, data annotation devices 130 are implemented utilizing distributed data annotation server system 110 and/or source data database 120. Network 140 can be one or more of a variety of networks, including, but not limited to, wide-area networks, local area networks, and/or the Internet as appropriate to the requirements of specific applications in accordance with embodiments of the invention.

Distributed data annotation system 110 is configured to obtain pieces of source data and store the pieces of source data using source data database 120. Source data database 120 can obtain source data from any of a variety of sources, including content sources, customers, and any of a variety of providers of source data as appropriate to the requirements of specific applications in accordance with embodiments of the invention. In a variety of embodiments, source data database 120 includes one or more references (such as a uniform resource locator) to source data that is stored in a distributed fashion. Source data database 120 includes one or more sets of source data to be annotated using distributed data annotation server system 110. A set of source data includes one or more pieces of source data including, but not limited to, image data, audio data, signal data, and text data. In several embodiments, one or more pieces of source data in source data database 120 includes source data metadata describing features of the piece of source data. Distributed data annotation server system 110 is further configured to generate sets of training data representative of the source data and identify the ground truth with respect to one or more features of the pieces of source data in the training data set. Distributed data annotation server system 110 then distributes the training data to one or more data annotation devices 130 and requests annotations of one or more features within the source data. Data annotation devices 130 generate annotations for one or more features within the source data and transmit annotated source data to distributed data annotation server system 110. Based on the annotated source data, distributed data annotation server system 110 is configured to determine annotator performance metadata describing the performance of the data annotation devices 130 based on the provided annotations and the ground truth for the pieces of source data in the training data set. Based on the annotator performance metadata, data annotation devices 130 are grouped into annotator groups. Distributed data annotation server system 110 is further configured to request annotations of pieces of source data not in the training data sets from one or more of the annotator groups based on the annotator performance metadata of distributed data annotation devices 130 within the targeted annotator groups. Distributed data annotation server system 110 can also calculate rewards or other compensation to be awarded to data annotation devices 130 based on their performance. In a number of embodiments, distributed data annotation server system 110 is configured to identify pieces of source data for refinement and iteratively distribute the identified pieces of source data to data annotation devices 130 to further refine, expand, and/or correct the annotations applied to the identified pieces of source data by previous data annotation devices 130. In many embodiments, distributed data annotation server system 110 provides annotator rankings reflecting the annotator performance on one or more annotation tasks and/or annotator profile information as described above. The annotation rankings can be utilized to specify the annotator performance desired for a particular annotation tasks and/or to determine reward levels for annotation tasks. In a variety of embodiments, the distributed data annotation server system 110 provides a user interface including the annotator rankings and/or annotator profile pages configured to display the annotator profiles. The user interface can be further configured to allow for the selection (e.g. targeting) of annotators for particular annotation tasks.

Data annotation devices 130 are configured to annotate pieces of source data based on features present in the source data and an annotation task directing data annotation devices 130 to identify particular features in pieces of source data. Data annotation devices 130 include, but are not limited to, human annotators, machine annotators, and emulations of human annotators performed using machines. Human annotators can constitute any human-generated annotators, including users performing human intelligence tasks via a service such as the Amazon Mechanical Turk service provided by Amazon.com, Inc. In the illustrated embodiment, data annotation devices 130 are illustrated as personal computers configured using appropriate software. In various embodiments, data annotation devices 130 include (but are not limited to) tablet computers, mobile phone handsets, software running on distributed data annotation server system 110, and/or any of a variety of network-connected devices as appropriate to the requirements of specific applications in accordance with embodiments of the invention. In several embodiments, data annotation devices 130 provide a user interface and an input device configured to allow a user to view the pieces of source data received by the data annotation device 130 and provide annotations (such as identifying features within a piece of source data) for the pieces of source data. In a number of embodiments, previously annotated features within the source data are highlighted and the user is asked to identify any other matching features within the source data and/or correct (or confirm) the existing annotation(s).

Distributed data annotation systems in accordance with embodiments of the invention are described above with respect to FIG. 1; however, any of a variety of distributed data annotation systems can be utilized in accordance with embodiments of the invention. Systems and methods for determining annotator performance in the distributed annotation of source data in accordance with embodiments of the invention are described below.

Distributed Data Annotation Server Systems

Figure 2:
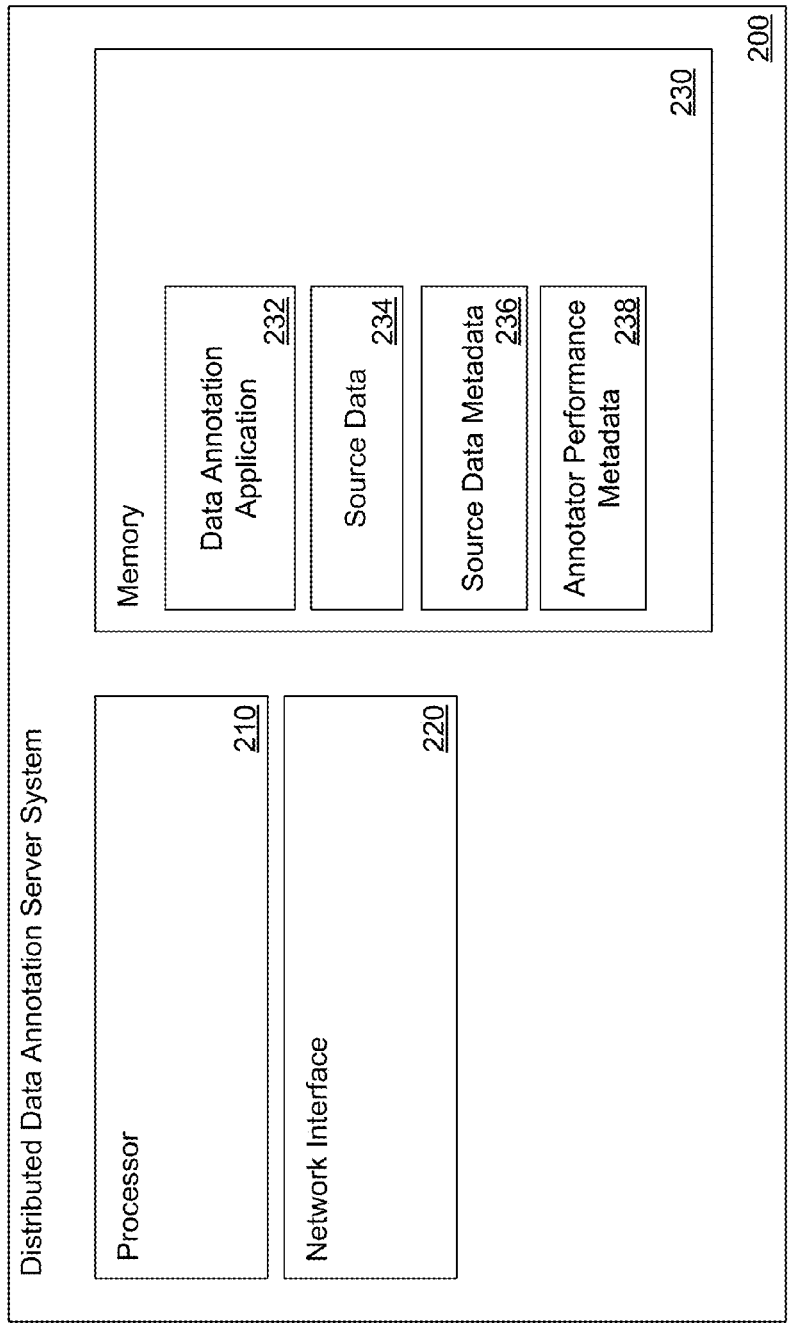
FIG. 2 conceptually illustrates a distributed data annotation server system in accordance with an embodiment of the invention.

Distributed data annotation server systems can be configured to determine sets of training data representative of sets of source data, determine annotator performance metadata based on annotations of the training sets of data by the annotators, and group the annotators for additional annotation tasks based on their performance. A distributed data annotation server system in accordance with an embodiment of the invention is conceptually illustrated in FIG. 2. Distributed data annotation server system 200 includes processor 210 in communication with memory 230. Distributed data annotation server system 200 also includes network interface 220 configured to send and receive data over a network connection. In a number of embodiments, network interface 220 is in communication with the processor 210 and/or memory 230. In several embodiments, memory 230 is any form of storage configured to store a variety of data, including, but not limited to, data annotation application 232, source data 234, source data metadata 236, and annotator performance metadata 238.

In many embodiments, source data 234, source data metadata 236, and/or annotator performance metadata 238 are stored using an external server system and received by distributed data annotation server system 200 using network interface 220. External server systems in accordance with a variety of embodiments include, but are not limited to, database systems and other distributed storage services as appropriate to the requirements of specific applications in accordance with embodiments of the invention.

Data annotation application 232 configures processor 210 to perform a distributed data annotation process for set of source data 234. The distributed data annotation process includes generating training data sets representative of the set of source data 234 and transmitting the training data sets to one or more annotators. The training data sets include pieces of source data and source data metadata describing the ground truth of one or more features within the source data. In a variety of embodiments, the training data sets are transmitted via network interface 220. In many embodiments, the selection of annotators is based on annotator performance metadata 238. The annotators are configured to generate annotations identifying one or more features within the received source data and generate source data metadata 236 containing the annotations. Source data metadata 234 can include, but is not limited to, annotations provided for the piece of source data, the source of the provided annotations, the time taken to annotate the piece of source data, rewards earned for providing the annotations, and/or one or more properties describing the piece of source data. In a variety of embodiments, data annotation application 232 configures processor 210 to perform the annotation processes. The distributed data annotation process further includes receiving the annotated pieces of source data and determining the performance of the annotators based on the source data metadata 236. The annotator performance is stored as annotator performance metadata 238. The annotators are grouped into annotator groups based on their performance. The distributed data annotation process additionally includes transmitting pieces of source data to the annotator groups based on their performance identified using the training data sets representing the source data.

In a number of embodiments, data annotation application 232 further configures processor 210 to determine rewards and/or other compensation awarded to a data annotation device for providing annotations to one or more pieces of source data using annotator performance metadata 238. In addition to the performance information described above, annotator performance metadata 238 can include pieces of source data annotated by the annotator, the annotations applied to the pieces of source data, previous rewards granted to the annotator, the time spent annotating pieces of source data, demographic information, the location of the annotator, clustering data describing how the annotator annotates pieces of source data, and any other characteristic of the annotator as appropriate to the requirements of specific applications in accordance with embodiments of the invention. In several embodiments, data annotation application 232 configures processor 210 to provide a user interface including the annotator rankings and/or annotator profile pages configured to display the annotator profiles as described above. In a variety of embodiments, data annotation application 232 configures processor 210 to allow for the targeting of particular annotators and/or groups of annotators for one or more annotation tasks based on the annotator rankings and/or the annotator profiles.

In many embodiments, the distributed data annotation process is performed in parallel across a variety of annotators. However, the distributed data annotation process can also be performed iteratively where a first set of annotators annotates pieces of source data and the first set of annotations is then provided to a second set of annotators that refine the first set of annotations and/or identify additional features within the pieces of source data. These additional features are then added into the set of annotations. Additionally, the distributed data annotation process can include clustering annotations of a particular feature within a piece of source data. This clustering of annotations can be utilized to determine the confidence (e.g. correctness) of the provided annotations and/or be utilized in the determination of the performance of the annotators providing the annotations as appropriate to the requirements of specific applications in accordance with embodiments of the invention.

Distributed data annotation server systems are described above with respect to FIG. 2; however, a variety of architectures, including those that store data or applications on disk or some other form of storage and are loaded into the memory at runtime can be utilized in accordance with embodiments of the invention. Processes for annotating source data, identifying annotator performance, and calibrating the annotation process to the annotator performance in accordance with embodiments of the invention are described below.

Grouping Annotators Based on Performance

Figure 3:
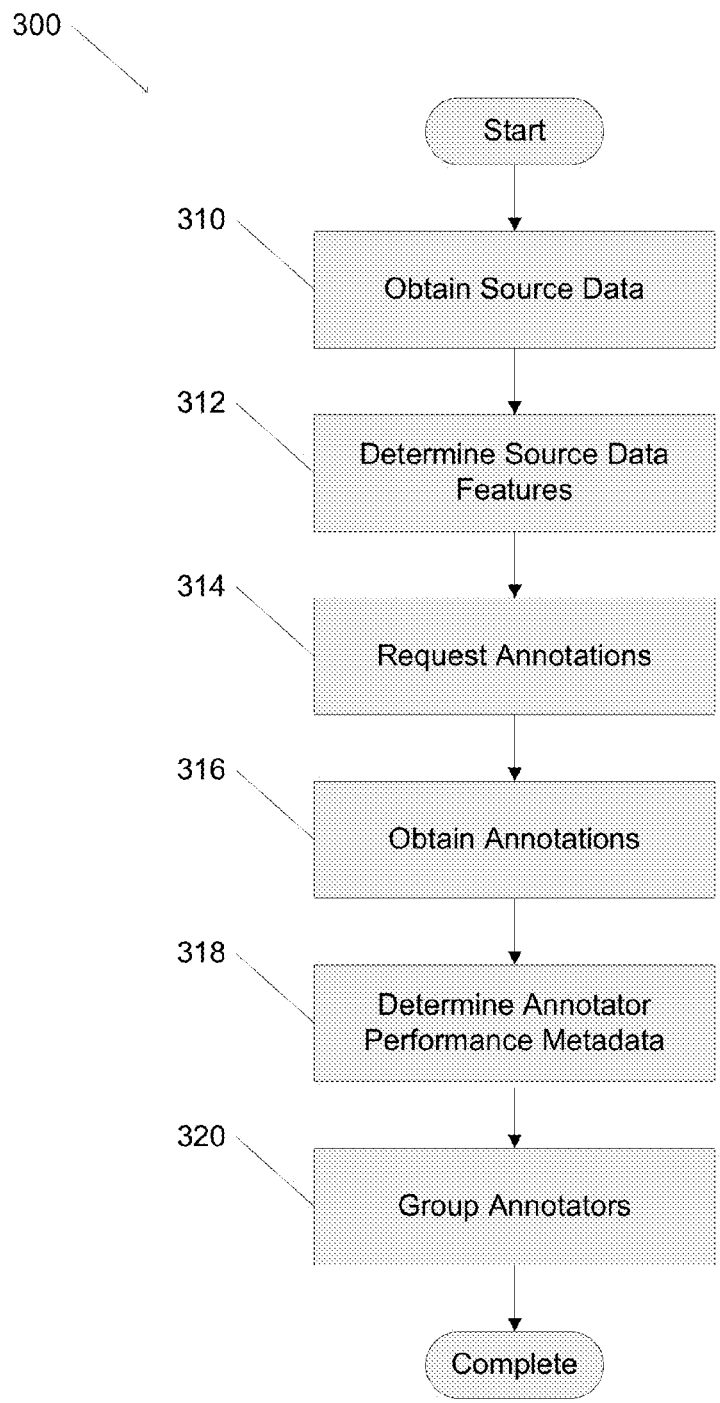
FIG. 3 is a flow chart conceptually illustrating a process for clustering annotators based on annotation performance in accordance with an embodiment of the invention.

In the crowdsourced annotation of source data, it is likely that a variety of annotators with a wide range of knowledge and ability will be utilized in the annotation of the source data. However, each annotator has an associated cost such as time, money, or both. Annotators can be trained to perform particular annotation tasks using training data sets. These training data sets can also be utilized to determine the relative performance of the annotators. The annotators can be grouped according to their performance and annotation tasks and/or rewards can be targeted towards the best (or adequate) performing annotators while additional time and/or money need not be allocated toward the poorly performing annotators. A process for grouping annotators based on their performance in accordance with an embodiment of the invention is illustrated in FIG. 3. The process 300 includes obtaining (310) source data and determining (312) features within the source data. Annotators are requested (314) and obtained (316). Annotator performance is determined (318) and the annotators are grouped (320).

In a variety of embodiments, the obtained (310) source data contains one or more pieces of source data. The pieces of source data can be, but are not limited to, image data, audio data, video data, signal data, text data, or any other data appropriate to the requirements of specific applications in accordance with embodiments of the invention. The pieces of source data can include source data metadata describing attributes of a piece of source data. Determining (312) source data features includes determining the ground truth regarding one or more features within some or all of the obtained (310) source data. The pieces of source data with determined (312) source data features are utilized to create a training data set representative of the obtained (310) source data. The source data features can be determined (312) as appropriate to the requirements of specific applications in accordance with embodiments of the invention, such as by expert annotators, known from the creation of the training data set, and/or crowdsourced utilizing systems similar to those disclosed in U.S. patent application Ser. No. 13/651,108, incorporated by reference above. In a variety of embodiments, requesting (314) annotations for the training data set includes creating one or more annotation tasks that configure an annotator (and/or a data annotation device) to annotate one or more features within a piece of source data. In several embodiments, requesting (314) annotations includes submitting the annotation task(s) to a human intelligence task marketplace, such as the Amazon Mechanical Turk service provided by Amazon.com, Inc. In a number of embodiments, requesting (314) annotations can include submitting an annotation task to an annotation device configured to perform machine intelligence tasks based on the annotation tasks. In a variety of embodiments, obtaining (316) annotations includes receiving the annotations from a data annotation device via a network connection. In many embodiments, obtaining (316) annotations includes transferring the annotations from one portion of memory or process on a distributed data annotation server system to another portion of memory or process on the distributed data annotation server system, although any of a variety of techniques can be utilized to obtain (316) annotations as appropriate to the requirements of specific applications in accordance with embodiments of the invention.

In a number of embodiments, annotator performance is determined (318) with respect to how well the annotations provided by the annotator correspond to the ground truth of those features as identified within the training data set. In many embodiments, this correspondence is determined by measuring the distance between the ground truth of the feature and the annotation of the feature using a thresholding heuristic. A list of detections $X=\{x_1, \ldots, x_n\}$ can be matched against the ground truth annotation list $Y=\{y_1, \ldots, y_n\}$ using a list of matched pair $M=(x_i, y_j)$ and distance threshold $\tau$. For each detection $x_i \epsilon X$, the closest ground truth detection $y_j \epsilon Y$ is found such that the distance $d(x_i, y_j) < \tau$ and $y_j$ does not belong to a pair in M. If $y_j$ is located in M, it is determined if there is a $x_k$ that is not in M that is closer to $y_j$. If so, $(x_k, y_j)$ is added to M, otherwise $(x_i, y_j)$ is added to M. The distance function can be any distance measure appropriate to the source data being annotated, such as (but not limited to) a distance measured between points in Euclidian space. This process is repeated for all $x_i \epsilon X$ that are not in M. Based on the sizes of X, Y and M the number of correct detections can be determined along with the number of incorrect detections (e.g. false alarms) and the number of missed annotations within the provided annotations. Annotator precision can be determined based on the number of correct detections, while annotator recall can be determined based on the total number of features annotated and the total number of features within the annotated portions of the training data set. In several embodiments, annotator performance metadata is determined (318) based on the precision and recall of the annotator. Annotator performance metadata can also be determined (318) based on the time it took the annotator to provide annotations and/or complete annotation tasks, the cost of the annotations, and/or any other annotator characteristic appropriate to the requirements of specific applications in accordance with embodiments of the invention.

In a variety of embodiments, annotator performance is determined (318) based on a confidence score calculated based on the clustering of detections across multiple annotators annotating the same piece of source data within the training data set. Processes for clustering of detections in accordance with embodiments of the invention are discussed in more detail below.

Grouping (320) annotators can be based on the determined (318) annotator performance metadata. The annotators can be grouped (320) based on the similarity of their annotator performance metadata and/or be grouped into groups if the annotator performance metadata exceeds a threshold value. This threshold value can be predetermined and/or determined dynamically based on the determined (318) annotator performance metadata. Other techniques can be utilized to group (320) the annotators as appropriate to the requirements of specific applications in accordance with embodiments of the invention. In many embodiments, annotators are grouped (320) based on the error rate of the annotators. The error rate r can be computed by $$r=(f+m)/(m+c)$$

where f is the number of false alarms, m is the number of misses, and c is the number of correct detections.

Although specific processes for the grouping of annotators based on the distributed annotation of pieces of source data are discussed above with respect to FIG. 3, any of a variety of processes, including those utilizing grouping techniques differing from those described above, can be performed in accordance with embodiments of the invention. Processes for determining annotation tasks and rewards, clustering annotations, and the iterative annotation of source data in accordance with embodiments of the invention are described below.

Determining Annotation Tasks and Rewards

Figure 4:
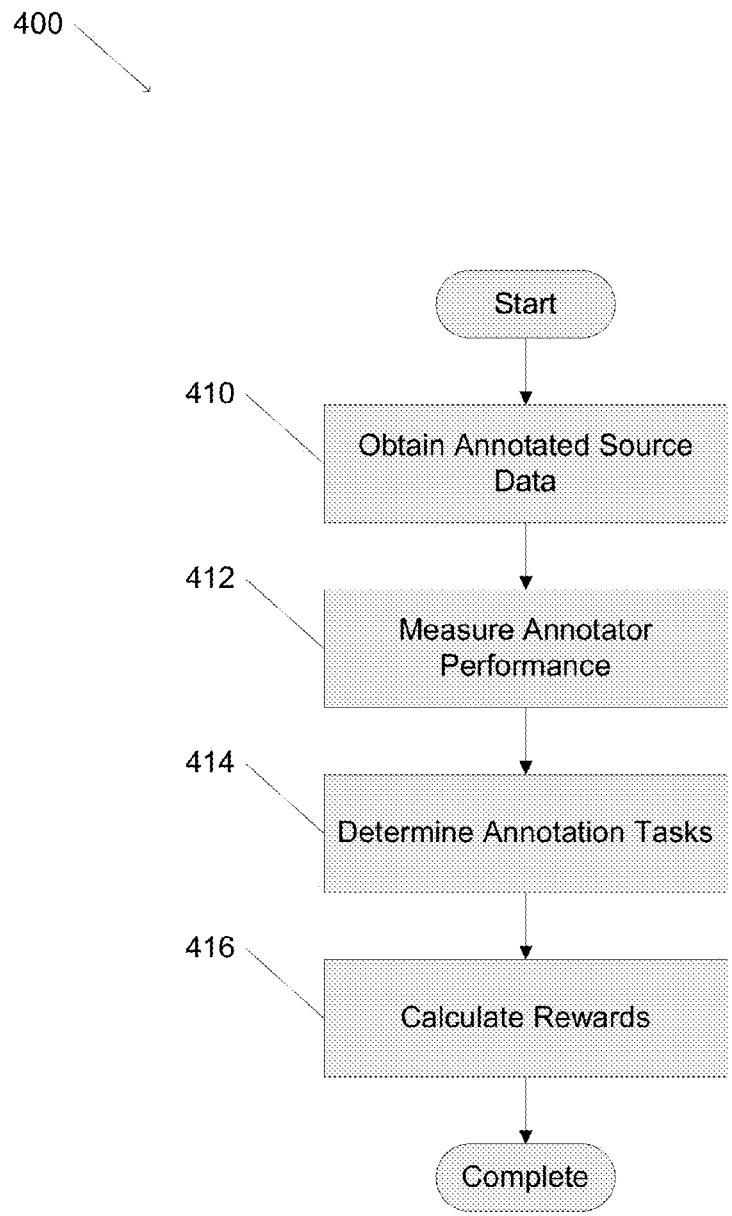
FIG. 4 is a flow chart conceptually illustrating a process for determining annotation tasks and rewards based on annotator performance in accordance with an embodiment of the invention.

In many cases, a cost is associated with obtaining annotations from an annotator. By having a model of different annotators, annotation tasks can be tailored toward the strengths of the annotator, reducing the total cost of obtaining the annotations. Likewise, rewards (such as monetary compensation) can be designated toward certain annotation tasks in order to incentivize annotators to complete a task quickly and/or to accept a certain task. A process for determining annotation tasks and rewards for annotation tasks in accordance with an embodiment of the invention is conceptually illustrated in FIG. 4. The process 400 includes obtaining (410) annotated source data. Annotator performance is measured (412). Annotation tasks are determined (414) and rewards are calculated (416).

In several embodiments, annotated source data is obtained (410) and annotator performance is measured (412) utilizing processes similar to those described above. Annotation tasks are designed to configure the annotators to annotate one or more features within pieces of source data. Determining (414) annotation tasks can be based on the features of the obtained (410) source data and/or the measured (412) annotator performance. In a variety of embodiments, the annotation task is tailored toward the ground truth of the pieces of source data in the obtained (410) annotated source data. In many embodiments, the annotation tasks are tailored toward the capabilities of the annotators as identified in the measured (412) annotator performance, such as, but not limited to, precision, recall, and time taken to provide annotations.

In a number of embodiments, rewards (such as monetary compensation) are granted to annotators for accepting and/or performing the determined (414) annotation tasks. Calculating (416) rewards can be based on a variety of factors as appropriate to the requirements of specific applications in accordance with embodiments of the invention, including the difficulty of the annotation task, the measured (412) annotator performance, and/or the time desired to complete the annotation task. For example, a larger reward can be calculated (416) for annotation tasks that are accepted and/or completed quickly, while lower rewards are calculated (416) for those annotation tasks where time is less of a factor. Similarly, larger rewards can be calculated (416) for higher-performing annotators to incentivize those annotators to participate in particular annotation tasks, while lower-performing annotators are not as richly rewarded. In this way, rewards are calculated (416) in order to improve the total cost and/or time taken to complete the determined (414) annotation tasks.

Although a specific process for determining subsets of a set of source data is described above with respect to FIG. 4, a variety of processes, including those that utilize alternative sampling schemes, can be performed in accordance with embodiments of the invention. Processes for clustering annotations and the iterative annotation of source data in accordance with embodiments of the invention are described below.

Clustering Annotations of Source Data Features

Figure 5:
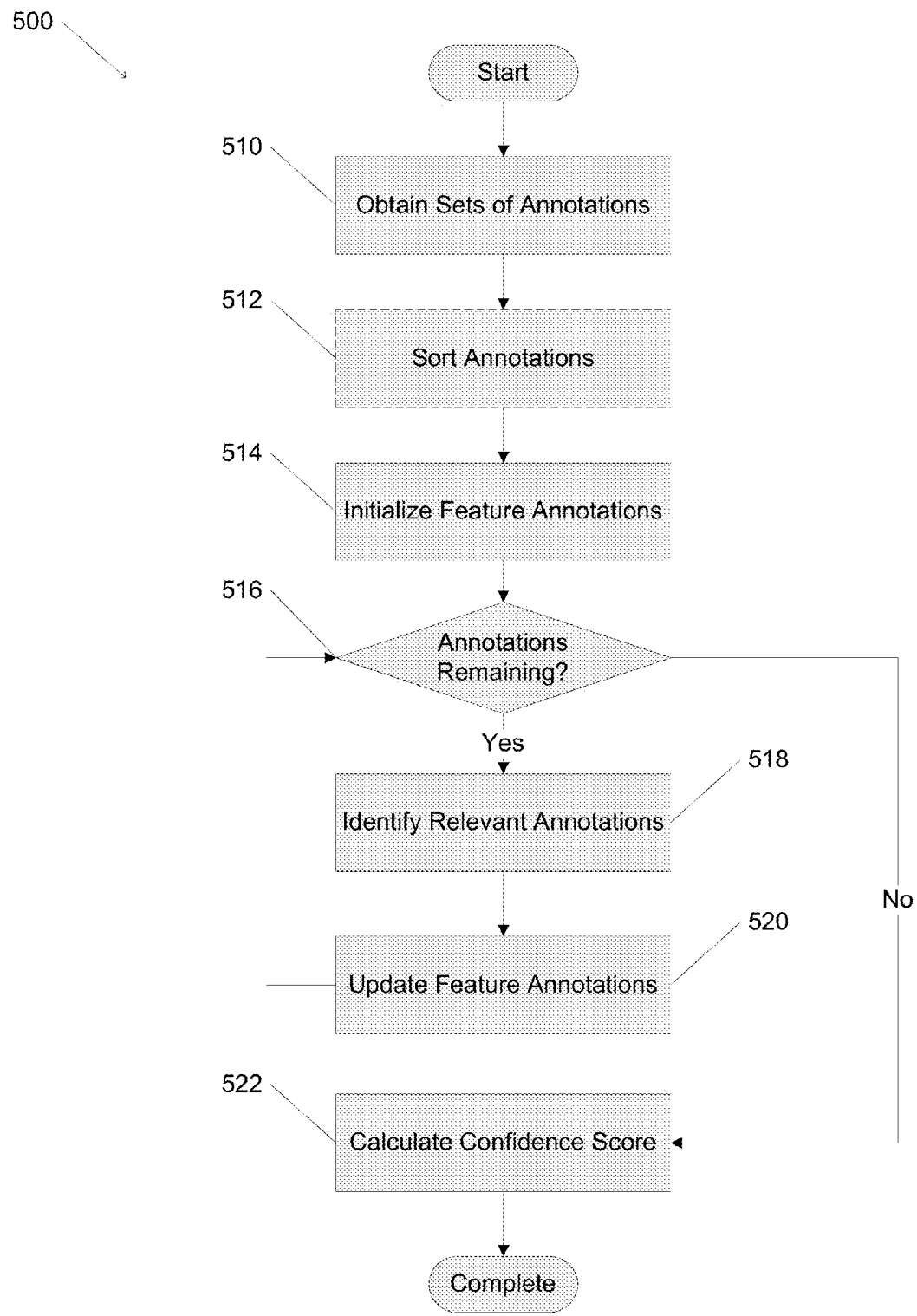
FIG. 5 is a flow chart conceptually illustrating a process for clustering annotations of features in pieces of source data in accordance with an embodiment of the invention.

When annotating features in a piece of source data, different annotators annotating the same feature may annotate different portions of the source data proximate the feature being annotated. Accordingly, an annotator may correctly identify a feature within a piece of source data yet still annotate a different portion of the source data than another annotator. By clustering the annotations for a particular feature in a piece of source data, a confidence value indicating the "correctness" of the annotations can be determined with respect to the particular feature. The confidence value can be utilized in the determination of the performance of the annotators with respect to a particular piece of source data. A process for clustering annotations of source data features in accordance with an embodiment of the invention is conceptually illustrated in FIG. 5. The process 500 includes obtaining (510) sets of annotations. In several embodiments, the annotations are sorted (512). Feature annotations are initialized (514). If additional annotations remain (516), relevant annotations are identified (518) and the feature annotations are updated (520). A confidence score can also be calculated (522).

In many embodiments, the annotations are obtained (510) utilizing processes similar to those described above. In a number of embodiments, the annotations are sorted (512) by size, although any sorting technique can be utilized as appropriate to the requirements of specific applications in accordance with embodiments of the invention. In several embodiments, the feature annotations are initialized (514) based on the largest annotations. In a variety of embodiments, the feature annotations are initialized (514) using a random set of annotations. Determining if any annotations are remaining (516) can include determining if any sets of annotations in the obtained (510) sets of annotations have not been considered. In several embodiments, identifying (518) relevant annotations includes identifying one or more annotations within a set of annotations that have not been previously considered that are within a threshold distance from annotations within the feature annotations. The distance can be determined utilizing any of a number of distance measurement techniques as appropriate to the requirements of specific applications in accordance with embodiments of the invention, such as a nearest neighbor analysis. Updating (520) the feature annotations can include adding the identified (518) relevant annotations to the feature annotations and/or replacing the least relevant annotation within the feature annotations with the identified (518) relevant annotation. Once no annotations are remaining (516), a confidence score can be calculated (522) based on the feature annotations. The confidence score reflects a measure, based on the clustering of annotations in the feature list, how likely it is that a particular feature within a piece of source data has been correctly identified by the annotators. In many embodiments, tightly clustered annotations have a high confidence score indicating that it is likely that a particular feature has been identified, while loosely clustered (or unclustered) annotations have a low confidence score, indicating that it is unlikely that a particular feature in the piece of source data is annotated.

In a number of embodiments, the obtained (510) sets of annotations include detection lists provided by one or more annotators. For the detection lists $$X=\{X_1, X_2, \ldots, X_n\}$$

provided by the various annotators, where $$X_P=\{x_{p1}, x_{p2}, \ldots, x_{ps}\}$$

is a list of detections from the pth annotator. Each detection is a D-dimension point $$x_{p1} \in \mathbb{R}^D$$

with a list of cluster centers $$C=\{c_1, \ldots, c_m\}$$

and a list of cluster assignments (e.g. the feature annotations)

$$A=\{A_1, \ldots, A_m\}$$

where $A_q$ is the list of detection in cluster q, the following clustering algorithm can be utilized in accordance with several embodiments of the invention to cluster the annotations:

1. Sort the lists in X by the size of each list, with the largest first. Denote the sorted list of lists of detections $\hat{X}$.
2. Initialize the cluster centers C and the cluster assignment lists A with the detections from the first list in $\hat{X}$ (the list with most detections).
3. For each of the remaining lists $X_p \in \hat{X}$, match the detections from list $X_p$ to the cluster centers in C and assign them to the corresponding assignment lists in A:
   (a) For each detection $x_{pi} \in X_p$, find the nearest neighbor cluster r (with center $c_r$) with no detections from the current detection list $X_p$ assigned to it.
   (b) If the distance to the nearest neighbor is greater than a threshold, $d(x_{pi}, c_r) > \tau$, then assign the detection to a new cluster. Add the new cluster center to C and add a new assignment list to A containing only $x_{pi}$. Process the next detection.
   (c) Otherwise, check if the nearest neighbor cluster r has other detections in $X_p$ that are closer than $x_{pi}$. If there are no such detections, then assign $x_{pi}$ to cluster r, i.e. add $x_{pi}$ to $A_r$.
   (d) If a closer detection $x_{pj}$ was found. i.e. $d(x_{pj}, c_r) < d(x_{pi}, c_r)$, then assign $x_{pj}$ to cluster r. Go back to (a) and try to assign $x_{pi}$ again.
   (e) Every time a detection is assigned to a cluster, the center of the cluster is recomputed by taking the mean location of all assigned detections.

The results of this algorithm can be utilized in the calculation (522) of a confidence score for each of the identified clusters. In a variety of embodiments, the clustering of annotations and the calculation (522) of the confidence score is determined based on an identified ground truth value for one or more features within a piece of source data. In several embodiments, the clustering of annotations and the calculation (522) of the confidence score is determined by the relative location (e.g. value) of the annotations relative to each other and the determine cluster(s). For example, those annotations that are tightly clustered together result in the calculation (522) of a higher confidence score than those annotations that are less tightly clustered. As described above, the calculated (522) confidence score can be utilized in determining annotator performance as appropriate to the requirements of specific applications in accordance with embodiments of the invention.

A specific process for clustering source data features is described above with respect to FIG. 5; however, a variety of processes, including those that utilize alternative clustering techniques, can be utilized in accordance with embodiments of the invention. Processes for the iterative annotations of features in pieces of source data in accordance with embodiments of the invention are described below.

Iterative Feature Annotation

Figure 6:
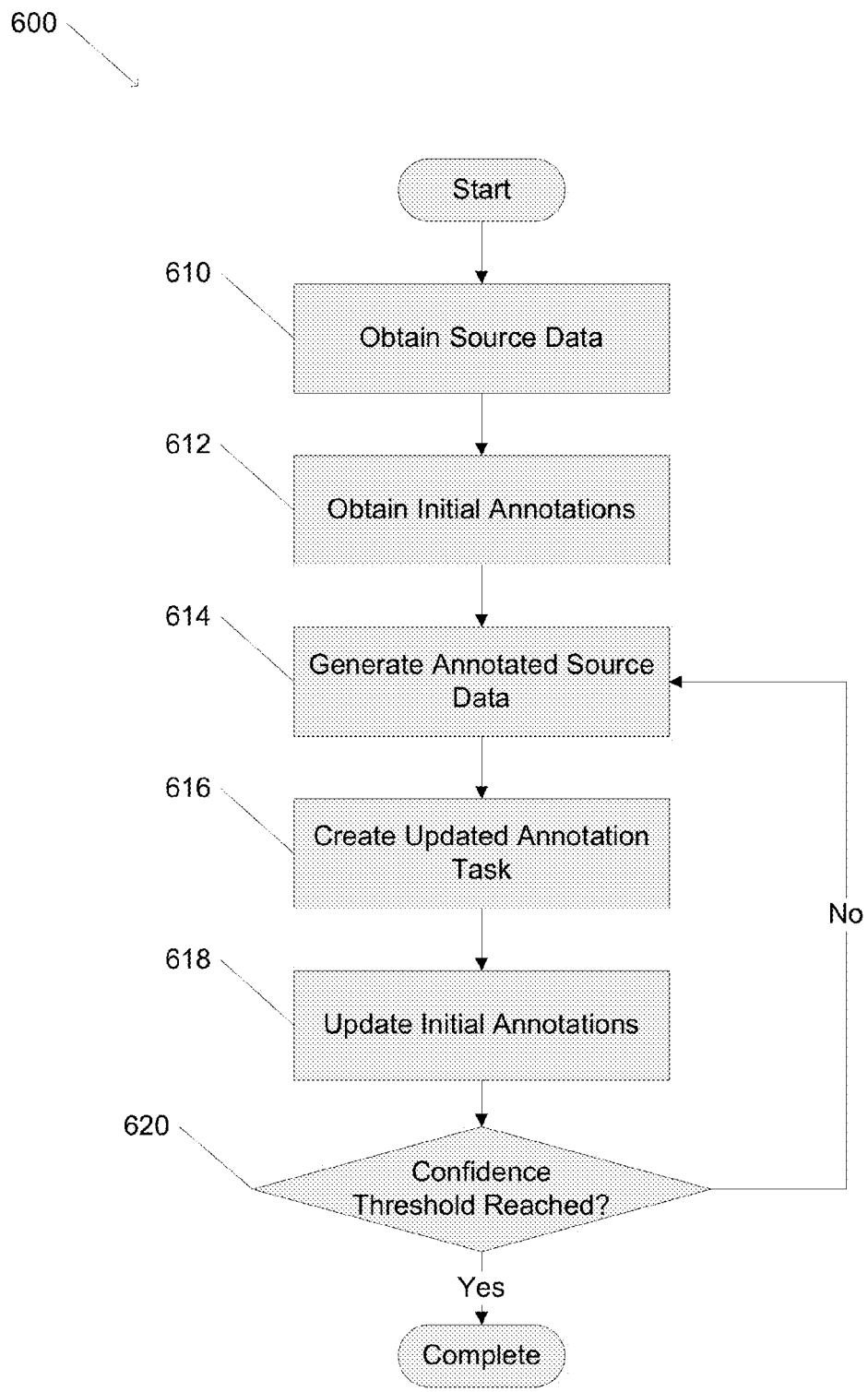
FIG. 6 is a flow chart conceptually illustrating a process for iteratively annotating features of pieces of source data in accordance with an embodiment of the invention.

Many pieces of source data are difficult to annotate. In many cases, the annotation of particular features of source data can be improved by having a first set of annotators provide an initial set of annotations identifying the particular features, then iteratively having additional annotators refine the initial set of annotations to correct any errors or missed features. A process for the iterative annotation of pieces of source data in accordance with an embodiment of the invention is conceptually illustrated in FIG. 6. The process 600 includes obtaining (610) a set of source data and obtaining (612) a set of initial annotations. Annotated source data is generated (614) and one or more updated annotation tasks are created (616). The initial annotations are updated (616). If a confidence threshold is reached (618), the process 600 completes. If the confidence threshold is not reached (618), annotated source data is generated (614) and the process repeats.

In several embodiments, obtaining (610) source data and obtaining (612) the initial annotations are performed utilizing processes similar to those described above. Annotated source data can be generated (614) by indicating the initial annotations in the obtained (610) pieces of source data. The updated annotation tasks are designed to configure annotators to identify features within the pieces of source data based on the initial annotations indicated in the generated (614) annotated source data and/or to refine (e.g. correct) the already identified annotations. In several embodiments, generating (614) the annotated source data includes clustering the initial annotations using clustering techniques similar to those described above. In a variety of embodiments, the creation (616) of updated annotation tasks is performed utilizing processes similar to those described above. The updated annotation tasks can be performed by annotators utilizing processes similar to those described above and the initial annotations are updated (618) based on the results of the updated annotation tasks.

In many embodiments, a confidence value is determined based on the difference between the initial annotations and the updated (618) initial annotations. As discussed above, the confidence value can be based on the distance between the annotations as presented in the updated annotation task and those in the updated (618) initial annotations. In a number of embodiments, the confidence value is based on the number of annotations modified in the updated (618) initial annotations. In a variety of embodiments, determining if the confidence threshold has been reached (620) involves comparing the confidence value to a predetermined and/or dynamically determined confidence threshold. The confidence threshold can be an absolute value and/or a delta between two or more computed confidence values. If the confidence value is within the confidence threshold, the process 600 completes. Otherwise, additional annotated source data is generated (614) based on the obtained (610) source data and the updated (618) initial annotations and the annotation task repeats until the confidence threshold value is reached.

A specific process for iterative annotating pieces of source data is described above with respect to FIG. 6; however, a variety of processes, including those that utilize alternative clustering techniques, can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for clustering annotators via a distributed data annotation process, comprising:
   obtaining a set of source data using a distributed data annotation server system, where a piece of source data in the set of source data comprises at least one identifying feature;
   determining a training data set representative of the set of source data using the distributed data annotation server system, where each piece of source data in the training data set comprises source data metadata describing the ground truth for the piece of source data, where the ground truth for a piece of source data describes the features contained in the piece of source data and a correct label associated with each feature;
   obtaining sets of annotations from a set of annotators for a portion of the training data set using the distributed data annotation server system, where an annotation identifies one or more features within a piece of source data in the training data set;
   for each annotator:
      determining annotator recall metadata based on the set of annotations provided by the annotator for the training data set using the distributed data annotation server system, where the annotator recall metadata comprises a measure of the number of features within a piece of source data identified with a label in the set of annotations by the annotator; and
      determining annotator precision metadata based on the set of annotations provided by the annotator for the training data set using the distributed data annotation server system, where the annotator precision metadata comprises a measure of the number of correct annotations associated with each piece of source data based on the ground truth for each piece of source data; and
   grouping the annotators into annotator groups based on the annotator recall metadata and the annotator precision metadata using the distributed data annotation server system.

2. The method of claim 1, further comprising generating an annotation task comprising a portion of the set of source data using the distributed data annotation server system, where the annotation task configures an annotator to annotate one or more features within the set of source data.

3. The method of claim 2, wherein the annotation tasks are targeted toward one or more annotator groups.

4. The method of claim 1, further comprising measuring the time taken by an annotator to provide an annotation within the sets of annotations using the distributed data annotation server system.

5. The method of claim 1, further comprising:
   calculating a reward based on the annotator recall metadata and the annotator precision metadata using the distributed data annotation server system; and
   providing the reward to an annotator for providing one or more annotations using the distributed data annotation server system.

6. The method of claim 5, wherein grouping annotators into annotator groups is further based on the calculated reward.

7. The method of claim 1, wherein the obtained sets of annotations are clustered into annotation clusters based on the features within the piece of source data identified by the annotations using the distributed data annotation server system.

8. The method of claim 7, wherein:
the set source data comprises image data; and
the annotation clusters comprise annotations that are within a distance threshold from each other within the image data.

9. The method of claim 7, wherein the annotation clusters comprise annotations that are within a distance threshold from the ground truth for the feature identified by the annotations.

10. The method of claim 7, further comprising:
determining an error rate for each annotator based on the annotation clusters using the distributed data annotation server system; and
grouping the annotators into annotator groups based on the determined error rate for the annotators using the distributed data annotation server system.

11. A distributed data annotation server system, comprising:
a processor; and
a memory configured to store a data annotation application;
wherein the data annotation application configures the processor to:
obtain a set of source data, where a piece of source data in the set of source data comprises at least one identifying feature;
determine a training data set representative of the set of source data, where each piece of source data in the training data set comprises source data metadata describing the ground truth for the piece of source data, where the ground truth for a piece of source data describes the features contained in the piece of source data and a correct label associated with each feature;
obtain sets of annotations from a set of annotators for a portion of the training data set, where an annotation identifies one or more features within a piece of source data in the training data set;
for each annotator:
determine annotator recall metadata based on the set of annotations provided by the annotator for the training data set, where the annotator recall metadata comprises a measure of the number of features within a piece of source data identified with a label in the set of annotations by the annotator; and
determine annotator precision metadata based on the set of annotations provided by the annotator for the training data set, where the annotator precision metadata comprises a measure of the number of correct annotations associated with each piece of source data based on the ground truth for each piece of source data; and
group the annotators into annotator groups based on the annotator recall metadata and the annotator precision metadata.

12. The system of claim 11, wherein the data annotation application further configures the processor to generate an annotation task comprising a portion of the set of source data, where the annotation task configures an annotator to annotate one or more features within the set of source data.

13. The system of claim 12, wherein the annotation tasks are targeted toward one or more annotator groups.

14. The system of claim 11, wherein the data annotation application further configures the processor to measure the time taken by an annotator to provide an annotation within the sets of annotations.

15. The system of claim 11, wherein the data annotation application further configures the processor to:
calculate a reward based on the annotator recall metadata and the annotator precision metadata; and
provide the reward to an annotator for providing one or more annotations.

16. The system of claim 15, wherein the processor is further configured to group annotators into annotator groups based on the calculated reward.

17. The system of claim 11, wherein the processor is configured to cluster the obtained sets of annotations into annotation clusters based on the features within the piece of source data identified by the annotations.

18. The system of claim 17, wherein:
the set source data comprises image data; and
the annotation clusters comprise annotations that are within a distance threshold from each other within the image data.

19. The system of claim 17, wherein the annotation clusters comprise annotations that are within a distance threshold from the ground truth for the feature identified by the annotations.

20. The system of claim 17, wherein the data annotation application further configures the processor to:
determine an error rate for each annotator based on the annotation clusters; and
group the annotators into annotator groups based on the determined error rate for the annotators.

* * * * *